(12) United States Patent
Aoki et al.

(10) Patent No.: US 6,222,693 B1
(45) Date of Patent: *Apr. 24, 2001

(54) RE-RECORDING/RE-PRODUCING DEVICE FOR MAGNETIC TAPE AND HEAD CLEANING

(75) Inventors: Shinji Aoki; Shinya Morita; Kumiko Suzuki, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/590,487

(22) Filed: Jan. 24, 1996

(30) Foreign Application Priority Data

Jan. 26, 1995 (JP) ..................................... 7-030013

(51) Int. Cl.⁷ ....................................... G11B 5/09
(52) U.S. Cl. ................ 360/53; 360/72.2; 360/73.06; 360/74.4; 360/128; 386/113; 386/46
(58) Field of Search ................... 360/70, 73.11, 360/77.13, 73.04, 72.3, 53, 130.31, 128, 137, 73.13, 75, 71, 72.1, 72.2, 73.06, 74.4, 74.1, 74.5, 25; 386/58, 52, 1, 21, 46, 100, 113; 15/1.51

(56) References Cited

U.S. PATENT DOCUMENTS

| | | | | |
|---|---|---|---|---|
| 3,731,289 | * | 5/1973 | Batgert et al. | 360/128 |
| 5,043,828 | * | 8/1991 | Sasho | 360/72.3 X |
| 5,253,126 | * | 10/1993 | Richmond | 360/53 |
| 5,349,713 | * | 9/1994 | Stimpfl | 360/137 X |
| 5,525,902 | * | 6/1996 | Nakajima et al. | 360/72.1 X |

* cited by examiner

*Primary Examiner*—Andrew L. Sniezek
(74) *Attorney, Agent, or Firm*—Frommer Lawrence & Haug, LLP.; William S. Frommer; Dexter T. Chang

(57) ABSTRACT

A re-recording/re-reproducing device cleans both the magnetic tape and head of dregs which cause errors in writing and reading. A magnetic head records and reproduces input digital data to and from a magnetic tape at a normal speed. When an error in writing or reading the input digital data is detected, the tape is moved to a position where the error is detected and the magnetic head re-records/re-reproduces the input digital data to and from the magnetic tape, but does so at a speed higher than the normal speed of recording/reproducing, resulting in the removal of the dregs from the magnetic tape and head.

26 Claims, 11 Drawing Sheets

RE-RECORDING/RE-PRODUCING DEVICE FOR MAGNETIC TAPE AND HEAD CLEANING

BACKGROUND OF THE INVENTION

1. Field of the Invention

The present invention relates to a magnetic tape recording/reproducing apparatus for recording and reproducing digital data supplied from for example an external computer.

2. Description of the Related Art

A magnetic tape recording/reproducing apparatus that is used as an external storage unit for a computer is known. In this case, a drive unit that loads a digital cassette tape is connected to a host computer through an interface. As an example of the data recorder, a helical scan type recorder that records digital data on a cassette tape with a rotating head is known.

Such a data recorder is connected to for example a SCSI (Small Computer Interface System) standard interface. Since the host computer recognizes the interface unit as a data recorder, it has a function for generating a file format on a tape and sending/receiving data to/from the tape (this function is referred to as formatter). The interface unit has a buffer memory that temporarily stores data transmitted between the host computer and the data recorder.

When an uncorrected error that cannot be corrected by signal processes such as a data recording process and a signal reproducing process takes place, with data temporarily stored in a buffer memory, write retry/read retry operations can be performed for the magnetic tape. For example, when data is read from the buffer memory and recorded on the tape for every buffer unit, the write retry operation is performed at an area (including a non-record area) followed by an invalid area in which data has not been recorded. When data is reproduced, the read retry operation is performed from an area in which data has not been reproduced.

As described above, the write retry operation and the read retry operation for data are certainly effective if a magnetic tape is partially damaged. However, in the case that dregs adhere on the tape or that magnetic particles of the magnetic tape adhere on a recording head or a reproduction head (this situation is referred to as head clogging), even if the different heads are used, since the tape with dregs is used, the write retry operation and the read retry operation for data cannot be performed. Alternatively, even if the different tape is used or the record area on the tape is changed, since the heads with dregs are used, the write retry operation and the read retry operation for the data cannot be performed.

OBJECT AND SUMMARY OF THE INVENTION

The present invention is made from the above-described point of view. An object of the present invention is to provide a magnetic tape recording/reproducing apparatus for performing a retry operation so as to record/reproduce data to/from a magnetic tape even if data cannot be recorded or reproduced due to head clogging or the like.

The present invention is a recording apparatus for a magnetic tape, comprising a recording means having a magnetic head for recording input digital data on the magnetic tape at a normal speed, a reproducing means for reproducing data recorded by the recording means, a driving means for driving the magnetic tape, a detecting means for detecting an error in data reproduced by the reproducing means and outputting an error detection signal representing the detected result, and a control means for controlling the driving means and the recording means corresponding to the error detection signal so that the input digital data corresponding to the detected error is re-recorded on the magnetic tape after the magnetic tape is moved to a re-recording start position corresponding to a tape position at which the error is detected at a speed higher than the normal speed so as to remove dregs from the magnetic head and the magnetic head.

When data with an uncorrected error is detected by a system controller 31, the system controller 31 sends a control signal to a motor drive circuit 49. With the control signal, a motor 50 is driven and thereby a magnetic tape 91 is moved from a first position to a second position. Thereafter, the magnetic tape 91 is moved to the first position once again. At the first position, a write retry operation or a read retry operation is performed.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENT

Figure 1:
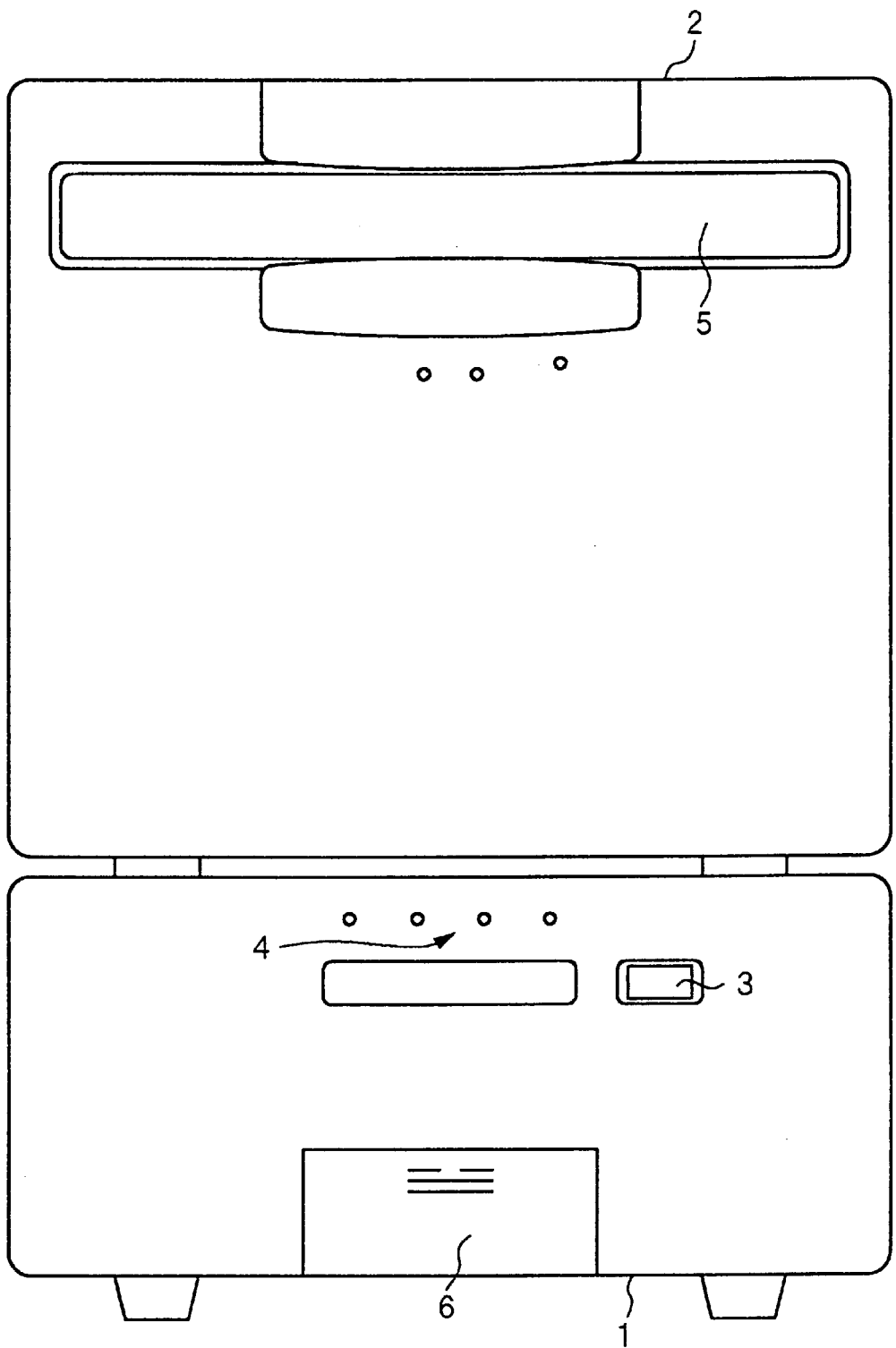
FIG. 1 is a front view showing a magnetic tape recording/reproducing apparatus according to the present invention.
Figure 2:
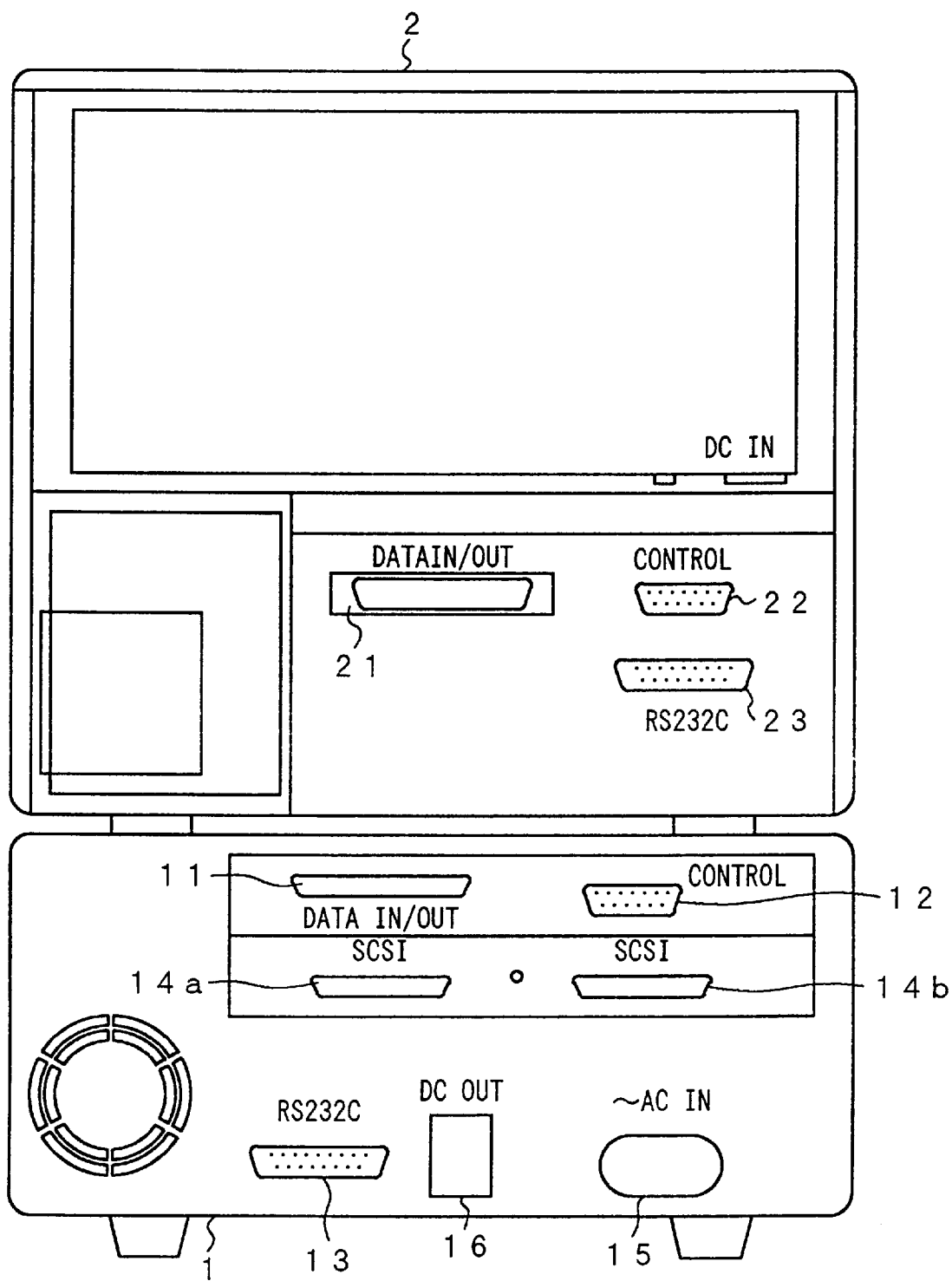
FIG. 2 is a rear view showing the magnetic tape recording/reproducing apparatus according to the present invention.

Next, with reference to the accompanying drawings, a data recorder according to the present invention will be described. The data recorder records/reproduces digital data to/from a cassette tape with a rotating head. FIG. 1 is a front view showing the data recorder. FIG. 2 is a rear view of the data recorder.

As shown in FIGS. 1 and 2, the data recorder is composed of two units that are an upper unit and a lower unit. The lower unit is literally disposed below the upper unit. The lower unit is a tape drive controller 1. The upper unit is a digital information recorder 2. The tape drive controller 1 has a front panel that includes a button 3 and a plurality of light emitting diodes 4. The button 3 is used to perform the loading/unloading processes for a cassette tape. The light emitting diodes 4 represent whether or not a cassette tape has been loaded, whether or not the power has been turned on, and so forth. In addition, the digital information recorder 2 has a detachable panel 6. Inside the detachable panel 6, other operation buttons are disposed. The digital information recorder 2 has a front panel with a cassette tape loading/unloading opening 5.

As shown in FIG. 2, on the rear panels of the tape drive controller 1 and the digital information recorder 2, a plurality of connectors are disposed. On the rear panel of the lower tape drive controller 1, a data input/output connector 11, a control connector 12, an RS232C connector 13, two SCSI connectors 14 and 14b, an AC power input connector 15, and a DC power output connector 16 are disposed.

On the rear panel of the digital information recorder 2, a data input/output connector 21, a control connector 22, and an RS232C connector 23 are disposed. By connecting a dedicated cable to the DC power output connector 16 of the tape drive controller 1, power is supplied to the digital information recorder 2. The data input/output connectors 11 and 21 are connected with a dedicated cable. Data is sent and received between the controller 1 and the recorder 2. The control connectors 12 and 22 are connected with a dedicated cable. Thus, control signals are exchanged between the controller 1 and the recorder 2. The RS232C connectors 13 and 23 are used for diagnosis purposes.

Figure 3:
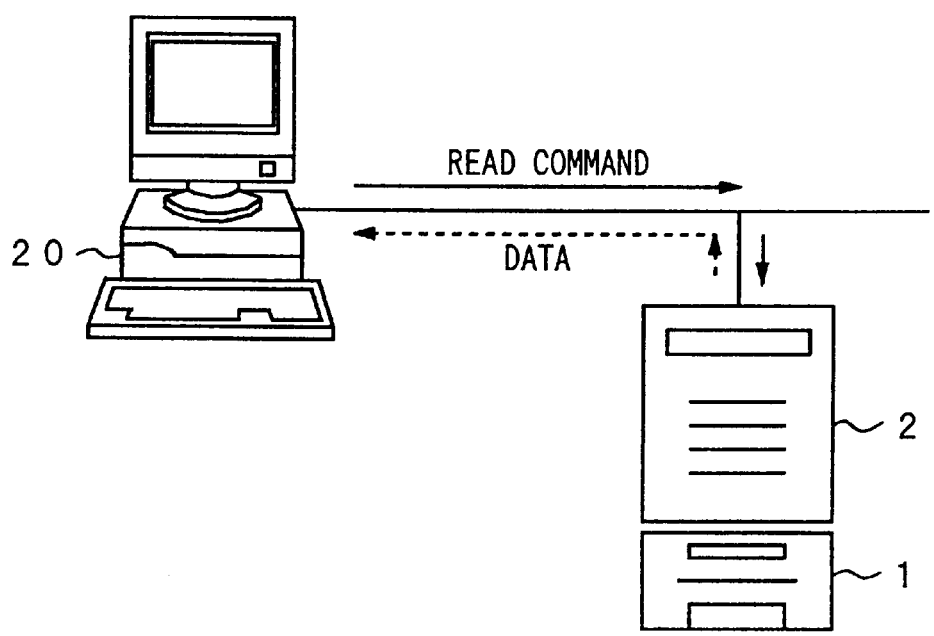
FIG. 3 is a schematic diagram showing an example of the application of the magnetic tape recording/reproducing apparatus according to the present invention.

As shown in FIG. 3, when a host computer 20 is connected to the data recorder, the SCSI connectors 14a and 14b are used. When the host computer 20 sends for example a read command to the data recorder, it outputs data to the host computer 20.

Figure 4:
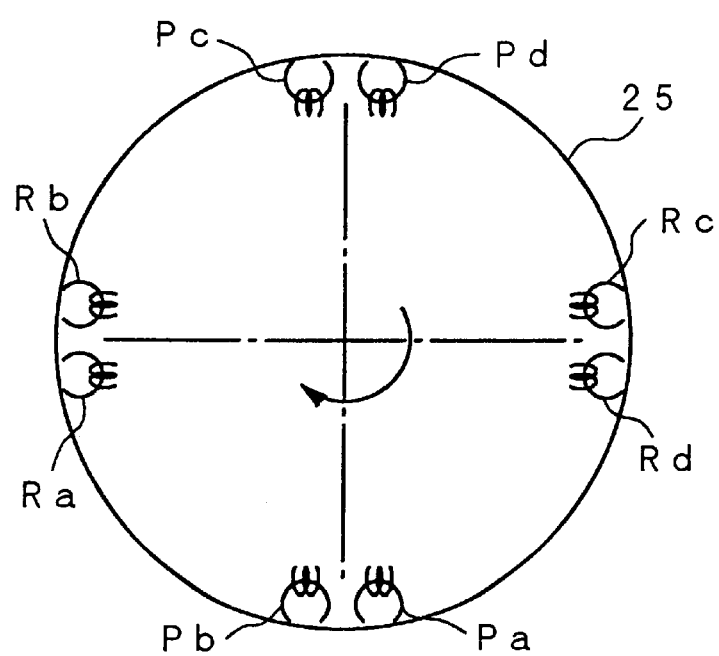
FIG. 4 is a schematic diagram showing a structure of heads of a digital information recorder.

The digital information recorder 2 records/reproduces data to/from a cassette tape with rotating heads. (In the following description, the rotating heads may be treated as a single head for convenience.) FIG. 4 shows the arrangement of the heads used in the recorder 2. Four record heads Ra, Rb, Rc, and Rd and four reproduction (playback) heads Pa, Pb, Pc, and Pd are disposed on a drum 25 that rotates at a predetermined speed in the direction shown in FIG. 4.

The heads Ra and Rb are adjacently disposed. This relation applies to pairs of heads Rc and Rd, heads Pa and Pb, and heads Pc and Pd. The extended directions of each pair of heads are different from each other. The extended directions are referred to as azimuths. Referring to FIG. 4, the heads Ra and Rc are disposed at an interval of 180° and have a first azimuth. The heads Rb and Rd are disposed at an interval of 180° and have a second azimuth. The heads Pa and Pc have the first azimuth. The heads Pb and Pd have the second azimuth. With the different azimuths, cross talks can be prevented between adjacent tracks. Each of the adjacent heads is integrally composed as one head. The integrally composed head is referred to as a double-azimuth head.

A tape (for example, ½ inch wide) that is led out of the cassette is helically wound around the periphery of the drum 25 for an angle range of 180° or greater. The tape is supplied at a predetermined speed. Thus, when a signal is recorded to the tape, in the first half period of one rotation of the drum 25, the heads Ra and Rb scan the tape. In the second half period, the heads Rc and Rd scan the tape. When a signal is reproduced from the tape, in the first period, the heads Pa and Pb scan the tape. In the second period, the heads Pc and Pd scan the tape.

Figure 5:
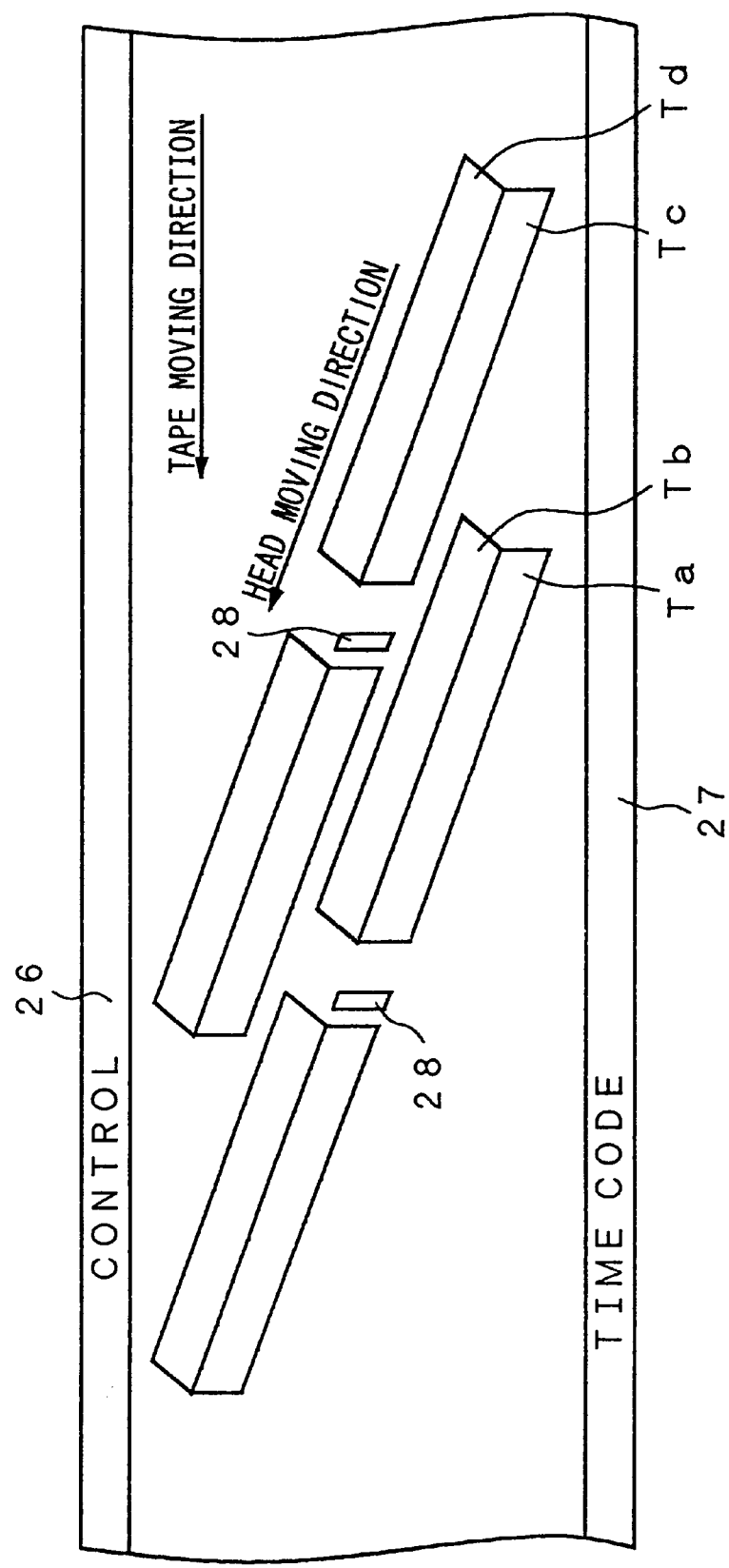
FIG. 5 is a schematic diagram showing a track pattern of a cassette tape.

FIG. 5 shows a track pattern on the tape of the digital information recorder 2. Longitudinal tracks are disposed in the width direction of the tape. Helical tracks are disposed between the longitudinal tracks. A control signal is recorded on an upper longitudinal track 26. A time code is recorded on a lower longitudinal track 27. The time code represents the position in the longitudinal direction of the tape. For example, the time code is an SMPTE time code. Whenever the drum 25 is rotated, the head Ra and Rb form two helical tracks Ta and Tb at the same time. Thereafter, the heads Ra and Rb form two helical tracks Tc and Td at the same time. On each helical track, a first half portion and a second half portion are separately formed. Between the first half portion and the second half portion of each helical track, a record area 28 is disposed. The record area 28 is used to record a tracking pilot signal.

The SMPTE time code was developed for a video signal for use with a VCR or the like. The minimum unit of the SMPTE time code is a frame (1/30 second). As will be described later, in the data recorder, data that can be recorded on the four tracks Ta to Td shown in FIG. 5 is defined as a logical data unit. When 16 tracks accord with one frame of a video signal, a subdigit (values 0, 1, 2, and 3) lower than the digit of the frame of the time code is defined. This time code is also referred as ID. Since the SMPTE time code has a user data area, such a modification can be performed.

Figure 6:
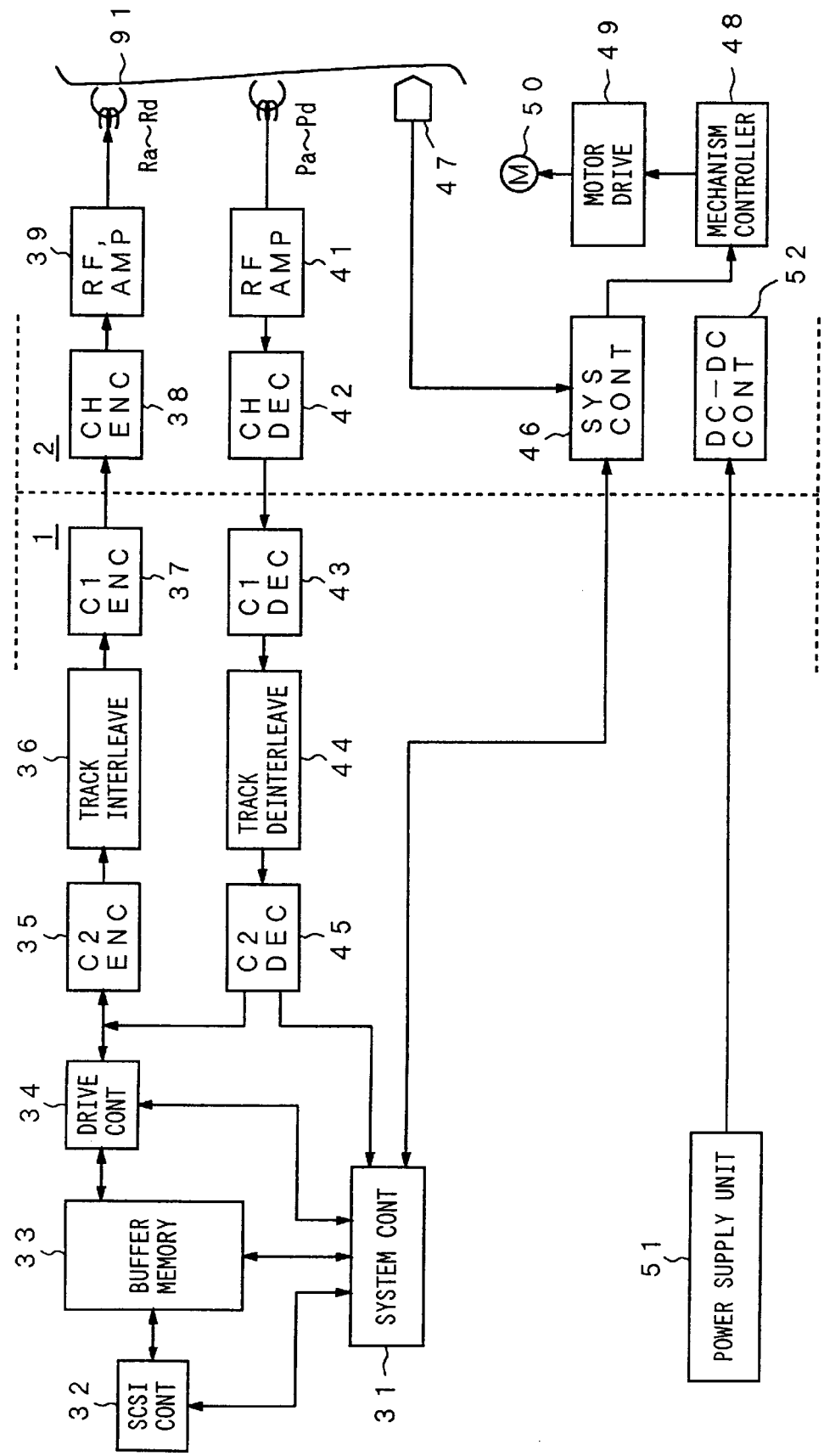
FIG. 6 is a block diagram showing a system structure of the magnetic tape recording/reproducing apparatus.

FIG. 6 is an outlined block diagram showing a system structure of the tape drive controller 1 and the digital information recorder 2. The controller 1 has a system controller 31. The system controller 31 has the following functions.

Managing a SCSI controller 32,
Managing a buffer memory 33,
Managing files/tables,
Writing/reading data and controlling retries,
Controlling the digital information recorder 2, and
performing self diagnosis.

The data recorder is connected to the host computer through the SCSI controller 32 of the digital information recorder 2. Data that is read from the buffer memory 33 is supplied to a C2 encoder 35 through the drive controller 34. Data that is received from the C2 encoder 35 is supplied to a C1 encoder 37 through a track interleave circuit 36.

The C2 encoder 35 and the C1 encoder perform an error correction encoding process for record data with a product code. The track interleave circuit 36 controls the distribution of data to tracks on the tape so as to improve the error correction performance in the recording/reproducing processes.

When data is recorded on the tape, it is recorded as SYNC blocks separated by a synchronous signal. In this case, the track interleave circuit 36 adds a block synchronous signal to the output signal of the C2 encoder 35. The C1 encoder 37 generates a C1 parity. Thereafter, data is randomized and words are interleaved in a plurality of SYNC blocks.

Digital data that is output from the C1 encoder 37 is supplied to the digital information recorder 2. The digital information recorder 2 encodes digital data received from a channel code encoder 38. The resultant record data is output to the record heads Ra to Rd through an RF amplifier 39. The heads Ra to Rd record the record data on the tape. The RF amplifier 39 performs a process corresponding to partial response class 4 (PR (1, 0, −1)).

Data reproduced from the tape by the reproduction heads Pa to Pd is supplied to a channel code decoder 42 through an RF amplifier 41. The RF amplifier 41 includes a reproducing amplifier, an equalizer, and a Viterbi decoder. The output data of the channel code decoder 42 is supplied to the tape drive controller 1. The output data of the channel code decoder 42 is supplied to a C1 decoder 43.

The C1 decoder 43 is connected to a track deinterleave circuit 44. The track deinterleave circuit 44 is connected to a C2 decoder 45. The C1 decoder 43, the track deinterleave circuit 44, and the C2 decoder 45 perform the reverse processes of the C1 encoder 37, the track interleave circuit 36, and the C2 encoder 35, respectively. The C2 decoder 45 supplies the reproduction (read) data to the buffer memory 33 through the drive controller 34. In addition, the C2 decoder 45 determines whether or not the reproduction (read) data is different from the record data. If they are different from each other, the C2 decoder 45 supplies an uncorrected error generation signal to the system controller 31.

The digital information recorder 2 has a system controller 46. In addition, the digital information recorder 2 has a fixed head 47 for the longitudinal tracks on the tape. The head 47 is connected to the system controller 46. The head 47 records/reproduces a control signal and a time code. The system controller 46 is connected to the system controller 31 of the tape drive controller 1 through a bidirectional bus. The system controller 31 determines whether or not data that is recorded or reproduced has an uncorrected error.

A mechanism controller 48 is connected to the system controller 46. The mechanism controller 48 includes a servo circuit that drives a motor 50 through a motor drive circuit 49. The system controller 46 has for example two CPUs. The system controller 46 communicates with the tape drive controller 1, controls recording/reproducing of a time code, controls recording/reproducing timings, and so forth using the CPUs.

The mechanism controller 48 has for example two CPUs. The mechanism controller 48 controls a mechanical system of the digital information recorder 2 with the CPUs. In particular, the mechanical controller 48 controls the rotation of the head and tape system, the tape speed, the tracking operation, loading/unloading processes of the cassette tape, and the tape tension. The motor 50 includes a drum motor, a capstan motor, a reel motor, a cassette mounting motor, a loading motor, and so forth.

The digital information recorder 2 has a DC-DC converting circuit 52 that receives a DC voltage from a power supply unit 51 of the tape drive controller 1. The digital information recorder 2 also has position sensors (such as a tape end detecting sensor), a time code generating/reading circuit, and so forth (that are not shown).

Figure 7:
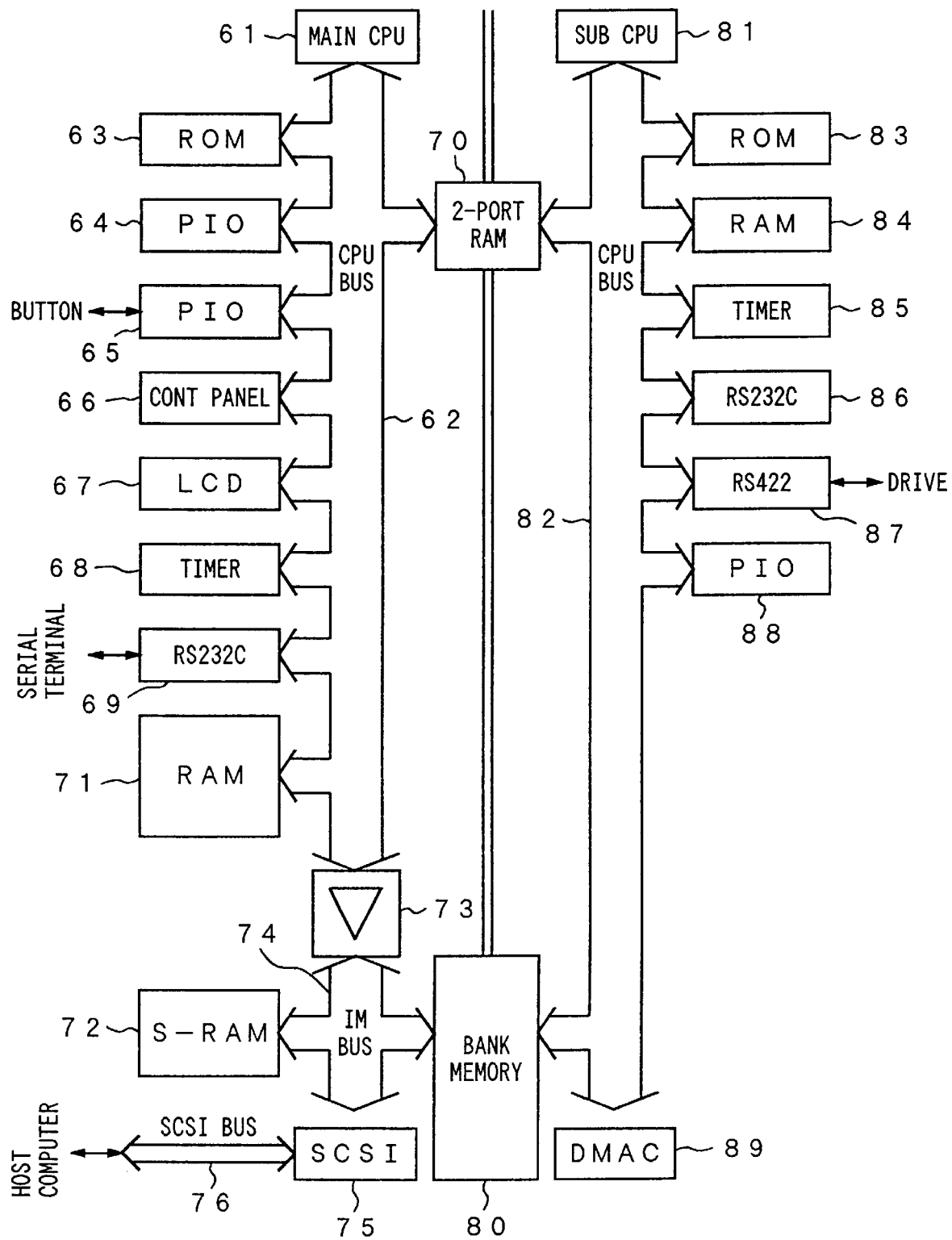
FIG. 7 is a detailed block diagram showing the system structure of the magnetic tape recording/reproducing apparatus.

FIG. 7 is a block diagram showing a system structure of the tape drive controller 1. Reference numeral 61 is a main CPU. Reference numeral 70 is a two-port RAM. Reference numeral 80 is a bank memory. Reference numeral 81 is a sub CPU. The main CPU 61 is a CPU that manages the entire system. In association with the main CPU 61, a CPU bus 62 is disposed. Each structural portion of the tape drive controller 1 is connected to the CPU bus 62. In other words, a ROM (flash ROM) 63, PIOs (parallel I/Os) 64 and 65, a control panel 66, an LCD 67, a timer 68, an RS232C interface 69, a two-port RAM 70, and a RAM 71 are connected to the CPU bus 62.

The PIO 65 is connected to a button on the front panel. The LCD 67 is a display unit that displays the operation state of the drive so that the user can know it. The RS232C interface 69 is connected to a serial terminal. The RAM 71 is a work RAM for use with firmware. The RAM 71 has a down-load area of programs and temporarily stores header information (VSIT (Volume Set Information Table/DIT (Directory Information Table)).

An IM bus 74 is connected to the CPU bus 62 through a unidirectional controlling device 73. An SRAM 72, a bank memory 80, and an SCSI controller 75 are connected to the IM bus 74. The host computer is connected to the SCSI controller 75 through a bus 76. The S-RAM 72 is a back-up RAM with a condenser. The SRAM 72 is used for a script memory (for storing a control program for the SCSI controller). In addition, the S-RAM 72 is used for a logger memory for representing a real operation state of the system. Since this memory is backed up with the condenser, after the power of the system is turned off, the memory can hold data for around two days.

The two-port RAM 70 stores five types of packets for communicating information between the two CPUs 61 and 81. The five types of packets are (1) a command transmission packet that is used when the main CPU 61 requests the sub CPU 81 to perform an operation, (2) an end status reception packet that is used when the end status of the operation of the sub CPU 81 is sent corresponding to a command requested by the main CPU 61, (3) a command status that is a flag representing the progress status of a command, (4) a drive management status table used to inform the main CPU 61 of the status of the drive (this table is rewritten by the sub CPU 81 at predetermined periods), and (5) a data send/receive packet that is a buffer used when the firmware on the CPU 81 side is downloaded from the CPU 61 side through the SCSI bus 71 or when a diagnosis on the CPU 81 side is activated with the RS232C interface 69 of the main CPU 61. The bank memory 80 is a buffer memory for data.

The sub CPU 81 is a CPU that controls the digital information recorder 2. In association with the sub CPU 81, a CPU bus 82 is disposed. The CPU bus 82 is connected to a ROM (flash ROM) 83, a RAM (work RAM) 84, a timer 85, an RS232C interface 86, an RS422 interface 87, a PIO (Parallel I/O) 88, and a DMA controller 89. In addition, the CPU bus 82 is connected to the two-port RAM 70 and the bank memory 80.

The bank memory 80 stores data that is written to the tape or data that is read from the tape 91. The DMA (Direct Memory Access) controller 89 stores data to the bank memory 80. The RS232C interface 86 is used for a self diagnosis. The RS422 interface 87 is a communication means with the digital information recorder 2.

Next, the record format of digital data will be described.

Figure 8:
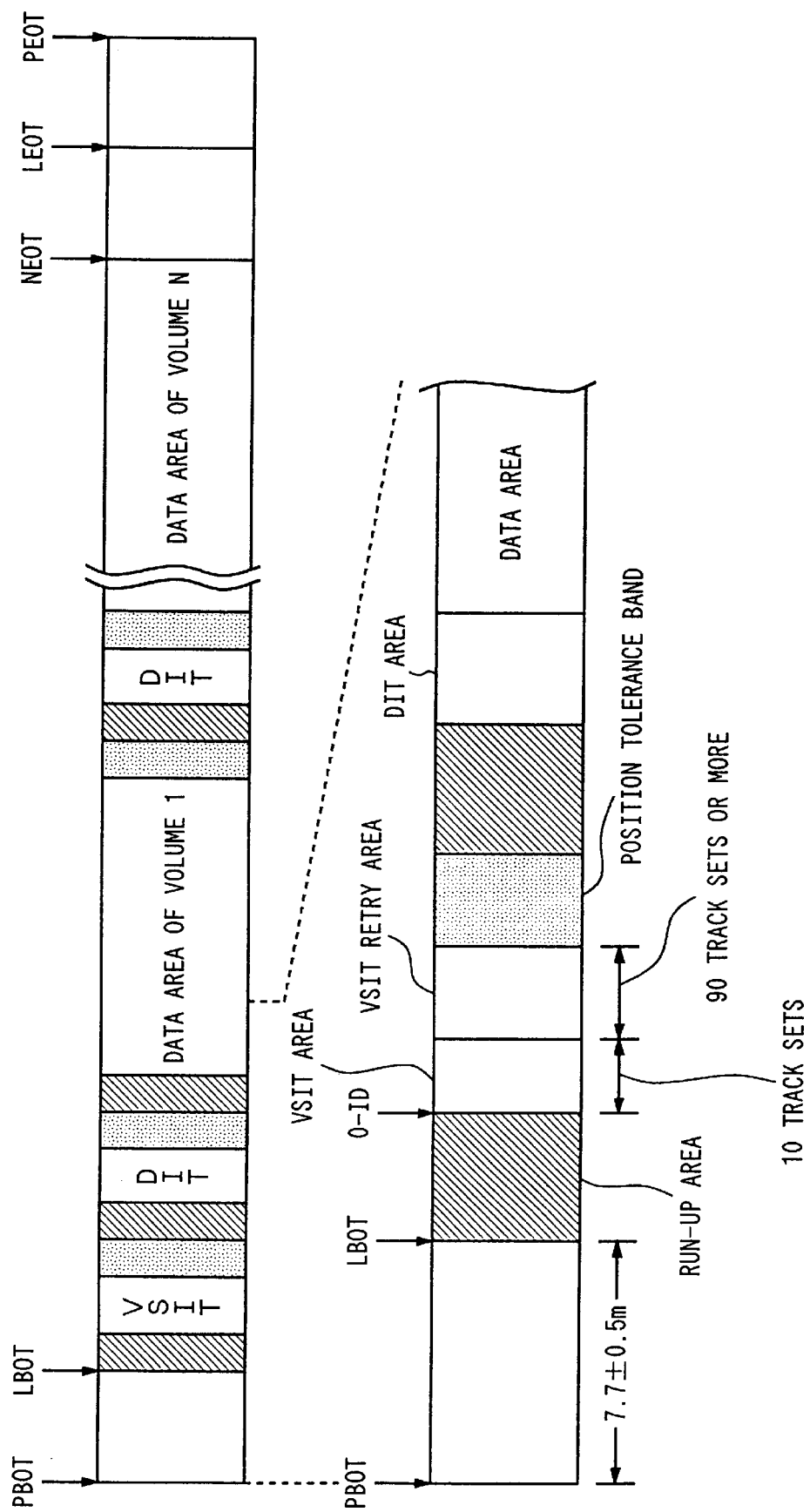
FIG. 8 is a schematic diagram showing a tape format of the cassette tape.

FIG. 8 shows the layout of the entire tape (in a cassette, for example). The entire tape is referred to as physical volume. The tape has a leader tape. Between the PBOT (Physical Beginning of Tape) and the PEOT (Physical End of Tape) of a physical tape, a recordable area is between the LBOT (Logical Beginning of Tape) and the LEOT (Logical End of Tape). The recordable area is defined because the tape tends to be damaged at the beginning and end of the tape and thereby the error rates thereof are high. For example, the invalid area between the PBOT and the LBOT is defined 7.7±0.5 m. In addition, the invalid area between the PEOT and LEOT is defined 10 m or greater.

One physical volume has a plurality of logical volumes (referred to as partitions).

To manage one or more logical volumes, a VSIT (Volume Set Information Table) is recorded at the beginning of the record area. The VSIT includes the number of volumes recorded on the tape and position information of the logical volumes on the tape. The position information includes start physical IDs and end physical IDs of DITs (Directory Information Tables) of up to 1024 logical volumes.

The position at the beginning of the VSIT is defined as the position of 0-ID. An ID (Identification) is an address corresponding to the position of every set of four tracks on the tape. IDs are simply incrementally assigned from the VSIT area to the DIT area of the last volume. The length of one VSIT is 1-ID.

A logical volume is composed of a DIT (Directory Information Table), an UIT, and a user data area. The DIT has information for managing a file in the logical volume. The length of one DIT is 40-IDs. The UIT is optional. The UIT is user information for managing a file.

In FIG. 8, hatched areas are run-up areas. With run-up areas, data tracks are servo-locked. Dotted areas are position tolerance areas. With the position tolerance areas, when the VSIT and the DIT are updated, valid data can be prevented from being erased.

Figure 9A:
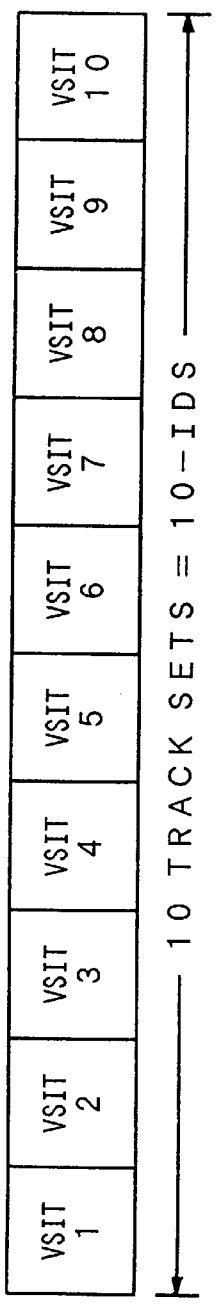
FIGS. 9A, 9B and 9C are schematic diagrams showing VSIT and DIT formats of the cassette tape.

As shown in FIG. 9A, the VSIT is repeatedly recorded ten times so as to improve the reliability of data. Thus, the VSIT area is composed of 10 track sets (=10-IDs). The VSIT area is followed by a retry area composed of 90 track sets or more.

Figure 9B:
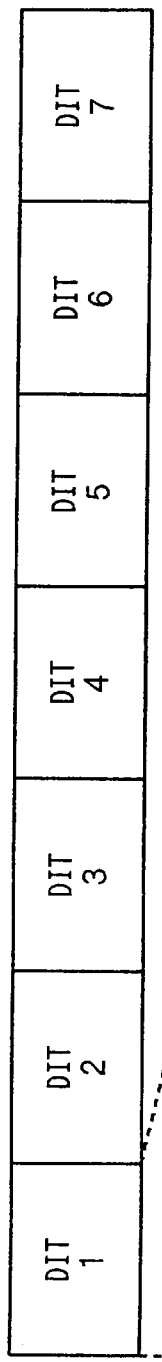
Figure 9C:
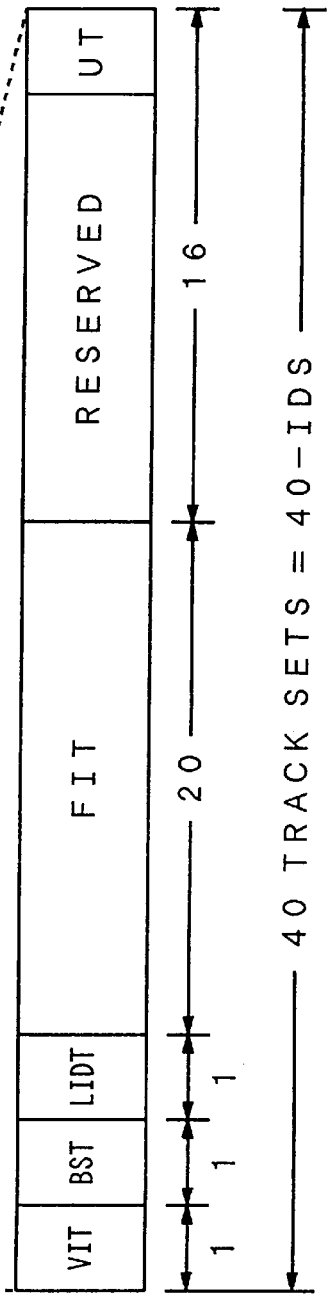

As shown in FIG. 9B, the DIT is repeatedly recorded seven times. As shown in FIG. 9C, the DIT is composed of six tables. The six tables are a VIT (Volume Information Table), a BST (Bad Spot Table), an LIDT (Logical Information Table), an FIT (File Information Table), a UT (Update Table), and a UIT (User Information Table) disposed in the order. Each of the VIT, the BST, the LIDT, and the UT has the length of 1-ID. The FIT has the length of 20-IDs. The remaining area for 16-IDs is reserved.

Next, each table of the DIT will be described. The ID address of the VIT is a physical ID at the beginning of volumes written in the VSIT. The logical ID of the VIT is equivalent to the physical ID at the beginning of the volumes written in the VSIT. The VIT includes a volume label and volume information such as a start physical ID of the first data block in the physical volume and the last physical ID thereof.

Figure 10:
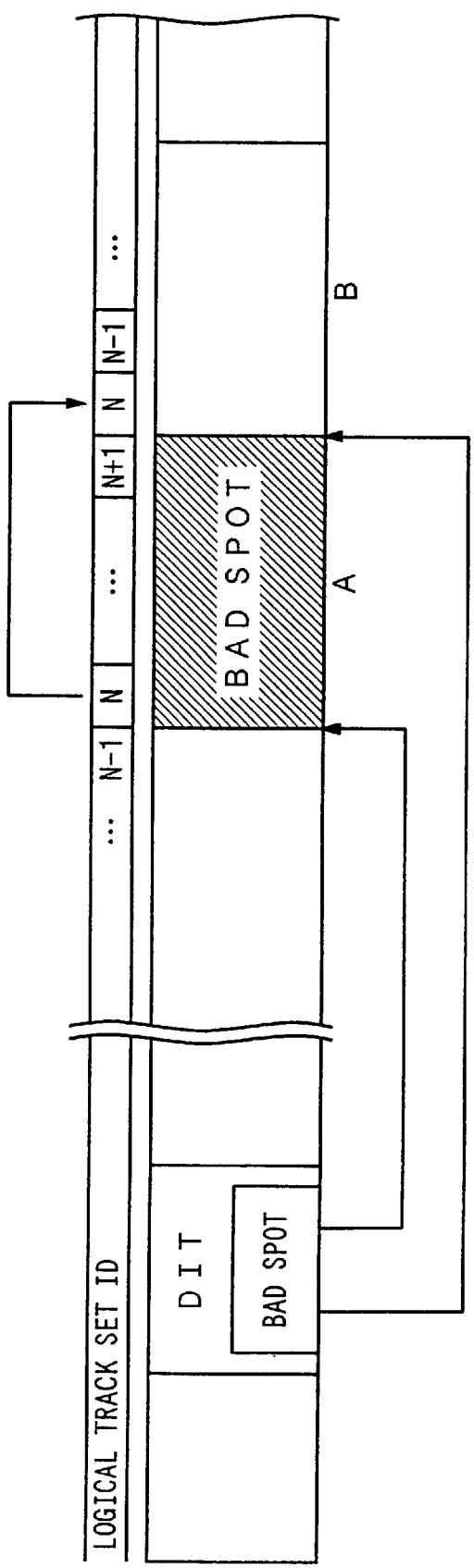
FIG. 10 is a schematic diagram for explaining a bad spot table.

The ID address of the BST is the physical ID of the VIT plus 1, whereas the logical ID thereof is the logical ID of the VIT plus 1. The BST has position information of logically invalid data. The logically invalid data is data that is treated invalid because of presence of the same track set ID. For example, as shown in FIG. 10, a hatched area A is logically invalid data. A write retry operation and a write operation associated therewith cause logically invalid data. When a write operation is performed, if an error takes place, a write retry is automatically performed and an error location thereof is output. The error location is stored in the BST. When a read operation is performed, the BST represents an invalid area. The logically invalid data is also referred to as bad spot. The BST can manage top physical IDs and last physical IDs of up to 14592 bad spots.

The ID address of the LIDT is the physical ID of the VIT plus 2, whereas the logical ID thereof is the logical ID of the VIT plus 2. The LIDT is a data table for a high speed block space and a locating operation. In other words, the LIDT includes logical IDs and physical IDs of pointers 1 to 29, file numbers, and the first block number of the ID data in the block management table.

The ID address of the FIT is the physical ID of the VIT plus 3, whereas the logical ID thereof is the logical ID of the VIT plus 3. The FIT is composed of a plurality of pairs of two types of data corresponding to tape marks. The tape marks are file delimiter codes. The N-th data pair accords with an Nth tape mark counted from the beginning of the volume. One data of each pair is the physical ID of the N-th tape mark. The other data of the pair is the absolute block number of the tape mark N. This value is the absolute block number of the last block with the same file number as the tape mark. With the physical ID and the absolute block number of the tape mark, the position of the tape mark can be precisely detected. Thus, a desired physical position on the tape can be accessed at a high speed.

The ID address of the UT is the physical ID of the VIT plus 39. The UT is information that represents whether or not a volume has been updated. Before a volume has not been updated, a word (four bytes) that represents the update status of the UT is FFFFFFFFh (h represents hexadecimal notation). After a volume has been updated, the word is 00000000h.

The UIT is optional. The UIT is an area of for example 100-IDs. The UIT is a user accessible data table for storing a user header.

Figure 11:
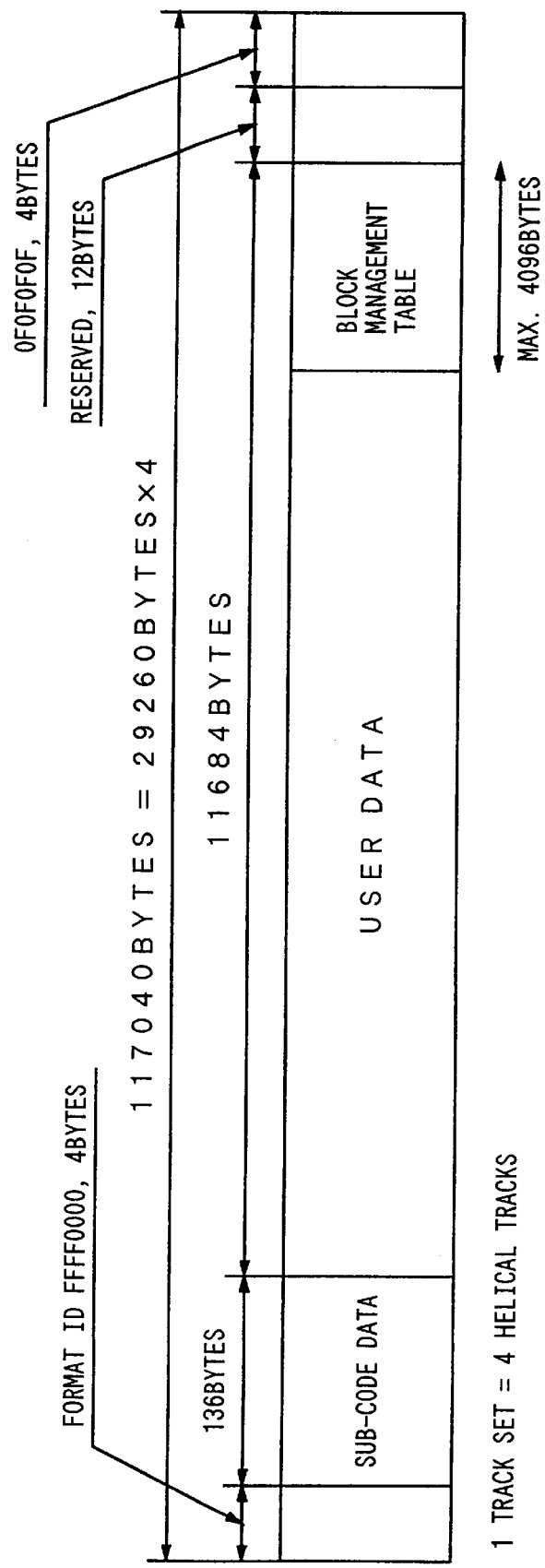
FIG. 11 is a schematic diagram showing a logical format of the cassette tape.

In this example, 1-ID is assigned to each track set composed of four helical tracks. The logical structure of a data block is defined for each track set. FIG. 11 shows the structure of a logical track set. The first four bytes of the logical track set are used for a format ID that is FFFF0000h.

The next 136 bytes (34 words) are used for an area for sub-code data. The sub-code data is composed of management information of a track set thereof. The sub-code data includes for example the above-described tables (such as VSIT, VIT, and BST) and ID codes (such as user data and tape marks).

The bytes of which the length of the block management table is subtracted from the next 116884 bytes are used for a user write area. When the track set is used for a user data write area, if the size of the user data is smaller than the size of the user data write area, dummy data is filled in the rest of the areas User data is followed by the block management table area. The length of the block management table is up to 4096 bytes. The last four bytes of the track set are used for a last code (0F0F0F0Fh) of the track set. The last code is preceded by a reserved area of 12 bytes. The block management table is used to manage the structure of a data block of user data. There are four types of track sets defined in the user data area, namely, a user data track set used for writing user data, a tape mark (TM) track set for representing a tape mark, an EOD (End of Data) track set for representing EOD, and a dummy track set for representing dummy data. For each track set type, a sub-code and a block management table are defined.

User data is followed by the block management table area. The length of the block management table is up to 4096 bytes. The last four bytes of the track set are used for a last code (0F0F0F0Fh) of the track set. The last code is preceded by a reserved area of 12 bytes. The block management table is used to manage the structure of a data block of user data.

Figure 12:
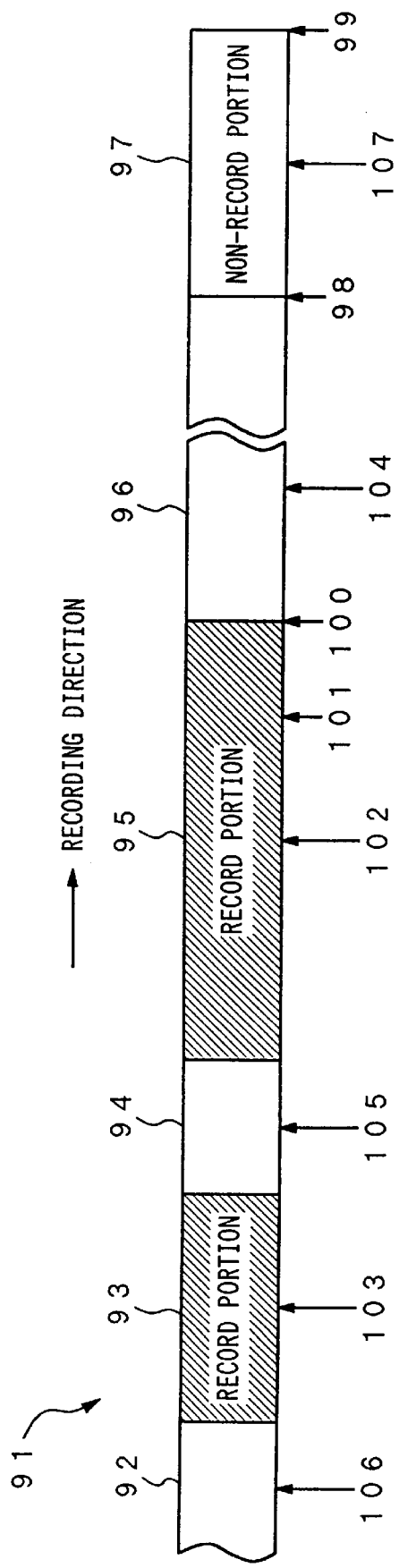
FIG. 12 is a schematic diagram showing a record data area of the cassette tape.

FIG. 12 is a schematic diagram showing a magnetic tape on which data is recorded by a data recorder. Data is recorded on a magnetic tape 91 in a record direction shown in the drawing. The magnetic tape 91 has an invalid data portion 92 (including a non-record portion), a record portion 93 (in which data has been recorded), an invalid data portion 94 (disposed between record portions (the invalid data portion 94 includes a non-record portion), a record portion 95 (on which data has been recorded (the record portion 95 includes a non-record portion)), and a non-record portion 97 (disposed between a logical tape last edge 98 and a physical tape last edge 99).

When data is recorded at the record portion 95, as a result of a signal process, if the C2 decoder 45 detects an uncorrected error at an uncorrected error point 100, data that just precedes the error point 100 is invalidated. In this case, the data to be recorded is recorded at the record portion 95. Next, six methods for a data write retry operation and a data read retry operation for the magnetic tape 91 will be described. In the following description, it is assumed that data has been recorded at the record portion 95 and that an uncorrected error has taken place at the error point 100. The write retry operation is performed until data is correctly recorded for example up to 10 times.

(1) The magnetic tape 91 is prerolled to a preroll point 102 of the record portion 95. When an uncorrected error is detected by the C2 decoder 45, it is determined that data just preceding the error point has not been recorded. Thus, the record portion 95 is treated as a bad spot. The record portion 95 is registered to the BST. The preroll point 102 is the top position of a tape tuning area necessary for an image connecting record operation. In addition, the preroll point 102 is set corresponding to the present position of the tape. The length between the preroll point 102 and the error point 100 is set to at least the length necessary for servo lock for the recording operation.

When the magnetic tape 91 is loaded, digital data information is read from the DIT by the system controller 81. When the C2 decoder 45 detects an uncorrected error, it sends an uncorrected error generation signal to the system controller 31. The system controller 31 sends a control signal to the motor drive circuit 49 corresponding to the signal. The motor 50 is driven corresponding to the control signal and thereby the magnetic tape 91 is prerolled to the preroll point 102. After the magnetic tape 91 is moved to the error point 100 (invalid data portion), the write retry operation is performed.

(2) The magnetic tape 91 is prerolled to the preroll point 103 of the record portion 93. In this case, data is recorded by the image connecting record operation. The length between the preroll point 103 and the error point 100 is set at least the length necessary for servo lock for the recording operation. The magnetic tape is prerolled to the preroll point 103. Just after the magnetic tape 91 is moved to the error point 100, the write retry operation is performed.

(3) The magnetic tape 91 is fast-forwarded to a search point 104 of the invalid data portion 96. Thereafter, the operation of the method (1) is performed. The fast-forward operation to the search point 104 is performed with an ID counter. The ID counter is composed of a servo circuit of the mechanism controller 48 (see FIG. 6). The servo circuit of the ID counter counts the relative tape length with IDs calculated corresponding to the length of the outermost diameter of the magnetic tape 91 and the angle of the reel that is rotated. 1-ID recorded on the tape is equivalent to one count of the ID counter. With the ID counter, the top of any record portion of the magnetic tape can be detected for every ID at a predetermined accuracy.

(4) The magnetic tape 91 is rewound to a search point 105 of the invalid data portion 94. The rewind operation is performed with the ID counter. Thereafter, the operation corresponding to the method (1) is performed.

(5) The magnetic tape 91 is rewound to a search point 106 of the invalid data portion 92. Likewise, the rewind operation is performed with the ID counter. Thereafter, the operation corresponding to the method (1) is performed.

(6) The magnetic tape 91 is fast-forwarded to a search point 107 of the non-record portion 97.

Likewise, this fast-forward operation is performed with the ID counter. Thereafter, the operation corresponding to the method (1) is performed.

As described above, when an uncorrected error takes place, the magnetic tape is prerolled, rewound, or fast-forwarded. Thus, the problem of the head clogging can be solved and the write retry operation for data can be performed. While a head clogging takes place while the record portion 95 is being reproduced, in the same manner as the recording mode, the magnetic tape 91 is prerolled, rewound, or fast-forwarded. When the magnetic tape is reproduced, if an error is detected at an uncorrected error point 101, the magnetic tape is prerolled, rewound, or fast-forwarded in the above-described manner. Thus, the read retry operation for data just preceding the error point 101 is performed. The read retry operation may be performed from the beginning of the data that precedes the error point 101. The read retry operation for data is performed until the data is correctly reproduced (for example, up to five times). The above-described six methods may be performed independently or as a combination thereof. When the above-described methods are used as a combination, the problem of the head clogging can be more accurately solved. The fast-forward operation or the rewind operation is performed depending on whether the tape is moved from an error point to a closer preroll/search point in the forward direction or the reverse direction.

In the above-described embodiment, the present invention is applied to a data recorder. However, it should be noted that the present invention can be applied to for example a helical scan type video tape recorder. In the above-described embodiment, the system controller 46 controls the mechanical controller 48 and thereby the motor 50 is rotated so that the magnetic tape is moved in the predetermined direction. However, the mechanical controller 48 may be controlled on the host computer side or by another unit that performs the same operation (for example, a dedicated experimental data collecting unit) through the SCSI controller 32.

According to the present invention, when an uncorrected error is detected while data is being recorded or reproduced, the magnetic tape is prerolled, rewound, or fast-forwarded. Thus, the problem of the head clogging is solved. Thereafter, the write retry operation or read retry operation for data is performed. Thus, the efficiency of the recording and reproducing operations can be improved. In addition, time necessary for repeated recording and reproducing operations can be reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A video recording apparatus for recording, to an information table of a magnetic tape, a tape position of bad spots on said magnetic tape, said recording apparatus comprising:

recording means having a magnetic head for recording input digital data on the magnetic tape at a normal speed;

reproducing means for reproducing said input digital data recorded by said recording means;

driving means for driving the magnetic tape;

detecting means for detecting an error in data reproduced by said reproducing means indicative of a bad spot on said magnetic tape and outputting an error detection signal representative thereof; and control means for controlling said recording means to record in said information table information indicating said tape position where said detecting means detects said error indicative of a bad spot on said magnetic tape, for controlling said driving means in response to the error detection signal to move the magnetic tape past the magnetic head directly to a search point corresponding to and located after said bad spot in one of a forward direction and a backward direction of tape movement on said magnetic tape without first moving the magnetic tape to the end thereof and then to the beginning thereof and at a speed higher than the normal speed such that dregs are removed from the magnetic head and the magnetic tape as a result of the higher speed movement of the tape past the head, for controlling said driving means in response to the error detection signal to move the magnetic tape in the other of the forward direction and the backward direction of tape movement to a re-recording start position corresponding to said tape position at which the error is detected, and for controlling said recording means in response to the error detection signal to begin a re-recording operation of the input digital data corresponding to the detected error at the re-recording start position.

2. The recording apparatus as set forth in claim 1, wherein said control means is adapted for moving the magnetic tape to a preroll point necessary for a servo lock operation and re-recording the digital data to the magnetic tape.

3. The recording apparatus as set forth in claim 1, wherein said control means is adapted for moving the magnetic tape to an invalid record portion of the magnetic tape and re-recording the digital data to the magnetic tape.

4. The recording apparatus as set forth in claim 1, wherein said control means is adapted for moving the magnetic tape a predetermined number of times until the digital data is correctly recorded.

5. The recording apparatus as set forth in claim 1, further comprising loading means for loading said magnetic tape; wherein said control means, upon loading of said magnetic tape, controls said reproducing means to reproduce said tape position of said bad spots and controls said driving means to drive said magnetic tape, at said speed higher than normal speed, to said tape position of said bad spots to remove said dregs from the magnetic head and the magnetic tape.

6. The recording apparatus as set forth in claim 5, wherein said magnetic tape is formatted into a plurality of volumes of recording areas; wherein said information table is a volume set information table recorded at a beginning of each volume of said magnetic tape; and wherein said control means controls said recording means to record said tape position of said bad spots in said volume set information table of a respective volume.

7. The recording apparatus according to claim 6, wherein said control means controls said driving means to fast-forward/rewind, at said speed higher than normal speed to remove said dregs, to a search point on said magnetic tape in the proximity of said tape position of said bad spots as indicated by said volume set information table, and controls said driving means to pre-roll to said tape position from said search point.

8. The recording apparatus as set forth in claim 6, further comprising a video recorder and a tape driver controller housing for housing said control means separately from said video recorder.

9. A video reproducing apparatus for reproducing, from an information table of a magnetic tape, a tape position of bad spots on said magnetic tape, said reproducing apparatus comprising:

recording means having a magnetic head for recording input digital data on the magnetic tape at a normal speed;

reproducing means for reproducing data from said magnetic tape;

driving means for moving the magnetic tape;

detecting means for detecting an error in data reproduced by said reproducing means indicative of a bad spot on said magnetic tape and outputting an error detection signal representative thereof; and control means for controlling said reproducing means to reproduce from said magnetic tape in said information table said tape position of said bad spot where said detecting means detects said error, for controlling said driving means in response to the error detection signal to move the magnetic tape past the magnetic head directly to a search point corresponding to and located after said bad spot in one of a forward direction and a backward direction of tape movement on said magnetic tape without first moving the magnetic tape to the end thereof and then to the beginning thereof and at a speed higher than the normal speed such that dregs are removed from the magnetic head and the magnetic tape as a result of the higher speed movement of the tape past the head, for controlling said driving means in response to the error detection signal to move the magnetic tape in the other of the forward direction and the backward direction of tape movement to a re-reproducing start position corresponding to said tape position at which the error is detected and for controlling said reproducing means in response to the error detection signal to begin a re-reproducing operation of the input digital data corresponding to the detected error at the re-reproducing start position.

10. The recording apparatus as set forth in claim 9, wherein said control means is adapted for moving the magnetic tape to a preroll point necessary for a servo lock operation and re-reproducing the digital data from the magnetic tape.

11. The recording apparatus as set forth in claim 9, wherein said control means is adapted for moving the magnetic tape to an invalid record portion of the magnetic tape and re-reproducing the digital data from the magnetic tape.

12. The recording apparatus as set forth in claim 9, wherein said control means is adapted for moving the magnetic tape a predetermined number of times until the digital data is correctly reproduced.

13. The reproducing apparatus as set forth in claim 9, further comprising loading means for loading said magnetic tape; wherein said control means, upon loading of said magnetic tape, controls said reproducing means to reproduce said tape position of said bad spots and controls said driving means to drive said magnetic tape, at said speed higher than normal speed, to said tape position of said bad spots to remove said dregs from the magnetic head and the magnetic tape.

14. The reproducing apparatus as set forth in claim 13, wherein said magnetic tape is formatted into a plurality of volumes of recording areas; wherein said information table is a volume set information table recorded at a beginning of each volume of said magnetic tape; and wherein said control means controls said recording means to record said tape position of said bad spots in said volume set information table of a respective volume.

15. The reproducing apparatus according to claim 14, wherein said control means controls said driving means to fast-forward/rewind, at said speed higher than normal speed to remove said dregs, to said search point on said magnetic tape in the proximity of said tape position of said bad spots as indicated by said volume set information table, and controls said driving means to pre-roll to said tape position from said search point.

16. The reproducing apparatus as set forth in claim 14, further comprising a video recorder and a tape driver controller housing for housing said control means separately from said video recorder.

17. A video recording and reproducing apparatus for recording, to an information table of a magnetic tape, a tape position of bad spots on said magnetic tape, said recording and reproducing apparatus comprising:

recording means having a magnetic head for recording input digital data on the magnetic tape at a normal speed;

reproducing means for reproducing data from said magnetic tape;

driving means for moving the magnetic tape;

detecting means for detecting an error in data reproduced by said reproducing means indicative of a bad spot on said magnetic tape and outputting an error detecting signal representative thereof; and control means for controlling said recording means to record in said information table information indicating said tape position where said detecting means detects said error indicative of a bad spot on said magnetic tape for controlling said driving means in response to the error detection signal to move the magnetic tape past the magnetic head, directly to a search point corresponding to and located after said bad spot in one of a forward direction and a backward direction of tape movement on said magnetic tape without first moving the magnetic tape to the end thereof and then to the beginning thereof and at a speed higher than the normal speed such that dregs are removed from the magnetic head and the magnetic tape as a result of the higher speed movement of the tape past the head, for controlling said driving means in response to the error detection signal to move the magnetic tape in the other of the forward direction and the backward direction of tape movement to a re-recording/re-reproducing start position corresponding to said tape position at which the error is detected and for controlling said recording means or said reproducing means in response to the error detecting signal to begin a re-recording or re-reproducing operation of the input digital data corresponding to the detected error at the re-recording/re-reproducing start position.

18. The recording and reproducing apparatus as set forth in claim 17, wherein said control means is adapted for moving the magnetic tape to a preroll point necessary for a servo lock operation and re-reproducing or re-recording the digital data from or to the magnetic tape.

19. The recording and reproducing apparatus as set forth in claim 17, wherein said control means is adapted for moving the magnetic tape to an invalid record portion of the magnetic tape and re-reproducing or re-recording the digital data from or to the magnetic tape.

20. The recording and reproducing apparatus as set forth in claim 17, wherein said control means is adapted for moving the magnetic tape a predetermined number of times until the digital data is correctly reproduced.

21. The recording and reproducing apparatus as set forth in claim 17, wherein the digital data that is input to said recording means is digital data supplied from an external computer.

22. The recording and reproducing apparatus as set forth in claim 17, wherein the digital data that is input to said recording means is video data supplied from the outside of said apparatus.

23. The recording and reproducing apparatus as set forth in claim 17, further comprising loading means for loading said magnetic tape; wherein said control means, upon loading of said magnetic tape, controls said reproducing means to reproduce said tape position of said bad spots and controls said driving means to drive said magnetic tape, at said speed higher than normal speed, to said tape position of said bad spots to remove said dregs from the magnetic head and the magnetic tape.

24. The recording and reproducing apparatus as set forth in claim 23, wherein said magnetic tape is formatted into a plurality of volumes of recording areas; wherein said information table is a volume set information table recorded at a beginning of each volume of said magnetic tape; and wherein said control means controls said recording means to record said tape position of said bad spots in said volume set information table of a respective volume.

25. The recording and reproducing apparatus according to claim 24, wherein said control means controls said driving means to fast-forward/rewind, at said speed higher than normal speed to remove said dregs, to said search point on said magnetic tape in the proximity of said tape position of said bad spots as indicated by said volume set information table, and controls said driving means to pre-roll to said tape position from said search point.

26. The recording and reproducing apparatus as set forth in claim 24, further comprising a video recorder and a tape driver controller housing for housing said control means separately from said video recorder.

* * * * *